US012615474B2

(12) United States Patent
Li

(10) Patent No.: US 12,615,474 B2
(45) Date of Patent: Apr. 28, 2026

(54) COVERING STRUCTURE, SOUND PRODUCING PACKAGE AND MANUFACTURING METHOD OF SOUND PRODUCING PACKAGE

(71) Applicant: XMEMS TAIWAN CO., LTD., Hsinchu County (TW)

(72) Inventor: Wei-Yang Li, Hsinchu County (TW)

(73) Assignee: XMEMS TAIWAN CO., LTD., Hsinchu County (TW)

(*) Notice: Subject to any disclaimer, the term of this patent is extended or adjusted under 35 U.S.C. 154(b) by 153 days.

(21) Appl. No.: 18/621,092

(22) Filed: Mar. 28, 2024

(65) Prior Publication Data

US 2025/0150751 A1 May 8, 2025

Related U.S. Application Data

(60) Provisional application No. 63/547,152, filed on Nov. 3, 2023.

(51) Int. Cl.
*H04R 1/28* (2006.01)
*H04R 19/02* (2006.01)
*H04R 31/00* (2006.01)

(52) U.S. Cl.
CPC ........... *H04R 1/2803* (2013.01); *H04R 19/02* (2013.01); *H04R 31/00* (2013.01); *H04R 2201/003* (2013.01)

(58) Field of Classification Search
CPC ...... H04R 1/2803; H04R 19/02; H04R 31/00; H04R 2201/003; H04R 17/00; H04R 1/021; H04R 1/2849; H04R 25/00; H04R 1/2842
See application file for complete search history.

(56) References Cited

U.S. PATENT DOCUMENTS 5,710,395 A * 1/1998 Wilke .................. H04R 1/2819 181/160
5,832,094 A * 11/1998 Le Her ................ H04R 25/606 381/328
9,433,271 B2 * 9/2016 Richardson ............ G10K 11/18
9,681,218 B2 * 6/2017 Sulowski ............. H04R 1/2811
11,930,345 B2 * 3/2024 Jiang ....................... H04R 9/025
(Continued)

FOREIGN PATENT DOCUMENTS

JP 10205680 A * 8/1998 .............. F16L 55/02

*Primary Examiner* — Oyesola C Ojo
(74) *Attorney, Agent, or Firm* — Winston Hsu

(57) ABSTRACT

A covering structure disposed within a sound producing package includes a tube structure, a first chamber and a first connecting structure. The tube structure has a first sound opening and a second sound opening, wherein a tube cavity connected between the first sound opening and the second sound opening exists inside the tube structure. A first cavity exists inside the first chamber and is connected to the tube cavity of the tube structure. The first connecting structure is connected between the tube structure and the first chamber, wherein the first connecting structure is between the first sound opening and the second sound opening, and the first cavity of the first chamber is connected to the tube cavity of the tube structure through the first connecting structure. An acoustic pathway of the covering structure is formed between the first sound opening and the second sound opening.

20 Claims, 6 Drawing Sheets

(56) References Cited

U.S. PATENT DOCUMENTS

| | | | | |
|---|---|---|---|---|
| 2004/0251079 | A1* | 12/2004 | Plummer | H04R 1/2857<br>181/156 |
| 2006/0093176 | A1* | 5/2006 | McIntosh | A61F 11/08<br>381/328 |
| 2009/0186673 | A1* | 7/2009 | Yamaguchi | H04M 1/035<br>455/575.8 |
| 2010/0329496 | A1* | 12/2010 | Mottonen | H04M 1/0245<br>381/345 |
| 2013/0028435 | A1* | 1/2013 | Christoph | G10K 11/17854<br>381/71.6 |
| 2014/0037099 | A1* | 2/2014 | Friis | H04R 25/305<br>381/60 |
| 2018/0234783 | A1* | 8/2018 | Clerici | H04R 17/00 |
| 2018/0359546 | A1* | 12/2018 | McGarry | D06M 10/025 |
| 2020/0126532 | A1* | 4/2020 | Ohtsu | G10K 11/161 |
| 2020/0204929 | A1* | 6/2020 | Zurbruegg | H04R 25/456 |
| 2020/0240299 | A1* | 7/2020 | Nathak | F01N 1/083 |
| 2021/0012762 | A1* | 1/2021 | Ohtsu | F24F 13/24 |
| 2021/0185430 | A1* | 6/2021 | Siig | H04R 1/28 |
| 2022/0014840 | A1* | 1/2022 | Shen | H04R 1/1091 |
| 2022/0381209 | A1* | 12/2022 | Kim | F02M 35/1272 |
| 2022/0386000 | A1* | 12/2022 | Wen | H04R 1/2811 |

* cited by examiner

COVERING STRUCTURE, SOUND PRODUCING PACKAGE AND MANUFACTURING METHOD OF SOUND PRODUCING PACKAGE

CROSS REFERENCE TO RELATED APPLICATIONS

This application claims the benefit of U.S. Provisional Application No. 63/547,152, filed on Nov. 3, 2023. The content of the application is incorporated herein by reference.

BACKGROUND OF THE INVENTION

1. Field of the Invention

The present application relates to a covering structure, a sound producing package and a manufacturing method of a sound producing package, and more particularly, to a covering structure appropriately affecting a sound pressure level (SPL) of an acoustic wave, to a sound producing package having this covering structure, and to a manufacturing method of this sound producing package.

2. Description of the Prior Art

Micro sound producing components, such as micro electro mechanical system (MEMS) speakers, are developed rapidly and widely used in various electronic devices due to their small size. For example, an MEMS speaker may use a thin film piezoelectric material as an actuator and a thin single crystal silicon layer as a membrane which are formed by at least one semiconductor process.

Due to the small size and fragile structure of the micro sound producing component, a covering structure would be used to cover and protect the micro sound producing component, such that a sound producing package including the micro sound producing component and the covering structure is formed, wherein the covering structure would have an acoustic pathway to make an acoustic wave propagate.

Generally, the sound producing package needs to be appropriately designed to have a suitable frequency response, so as to make the acoustic wave generated by the sound producing package meet some requirements. In some cases, the sound producing package would be designed based on a sound producing device where the sound producing package is disposed. For example, the acoustic wave generated by a hearing aid (a kind of the sound producing device) needs to meet a specific standard, so as to make the user of the hearing aid hear the sound. However, it is difficult and costly to make the sound producing package and/or the sound producing device meet the requirements by designing the micro sound producing component. Thus, there is a need for improvement over the prior art.

SUMMARY OF THE INVENTION

It is therefore a primary objective of the present invention to provide a covering structure including a tube structure and at least one chamber for appropriately affecting a sound pressure level (SPL) of an acoustic wave. Furthermore, a sound producing package having this covering structure is provided in the present invention, and a manufacturing method of this sound producing package is provided in the present invention also.

An embodiment of the present invention provides a covering structure disposed within a sound producing package. The covering structure includes a tube structure, a first chamber and a first connecting structure. The tube structure has a first sound opening and a second sound opening, wherein a tube cavity connected between the first sound opening and the second sound opening exists inside the tube structure. A first cavity exists inside the first chamber and is connected to the tube cavity of the tube structure. The first connecting structure is connected between the tube structure and the first chamber, wherein the first connecting structure is between the first sound opening and the second sound opening, and the first cavity of the first chamber is connected to the tube cavity of the tube structure through the first connecting structure. An acoustic pathway of the covering structure is formed between the first sound opening and the second sound opening.

Another embodiment of the present invention provides a sound producing package including a sound producing component and a covering structure. The sound producing component is configured to produce an acoustic wave. The covering structure covers the sound producing component, and the covering structure includes a tube structure, a first chamber and a first connecting structure. The tube structure has a first sound opening and a second sound opening, wherein a tube cavity connected between the first sound opening and the second sound opening exists inside the tube structure. A first cavity exists inside the first chamber and is connected to the tube cavity of the tube structure. The first connecting structure is connected between the tube structure and the first chamber, wherein the first connecting structure is between the first sound opening and the second sound opening, and the first cavity of the first chamber is connected to the tube cavity of the tube structure through the first connecting structure. An acoustic pathway of the covering structure is formed between the first sound opening and the second sound opening, and the acoustic wave propagates through the acoustic pathway.

Another embodiment of the present invention provides a manufacturing method of a sound producing package. The manufacturing method includes: forming a sound producing component, wherein the sound producing component is configured to produce an acoustic wave; and forming a covering structure to cover the sound producing component. The covering structure includes a tube structure, a first chamber and a first connecting structure. The tube structure has a first sound opening and a second sound opening, wherein a tube cavity connected between the first sound opening and the second sound opening exists inside the tube structure. A first cavity exists inside the first chamber and is connected to the tube cavity of the tube structure. The first connecting structure is connected between the tube structure and the first chamber, wherein the first connecting structure is between the first sound opening and the second sound opening, and the first cavity of the first chamber is connected to the tube cavity of the tube structure through the first connecting structure. An acoustic pathway of the covering structure is formed between the first sound opening and the second sound opening, and the acoustic wave propagates through the acoustic pathway.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
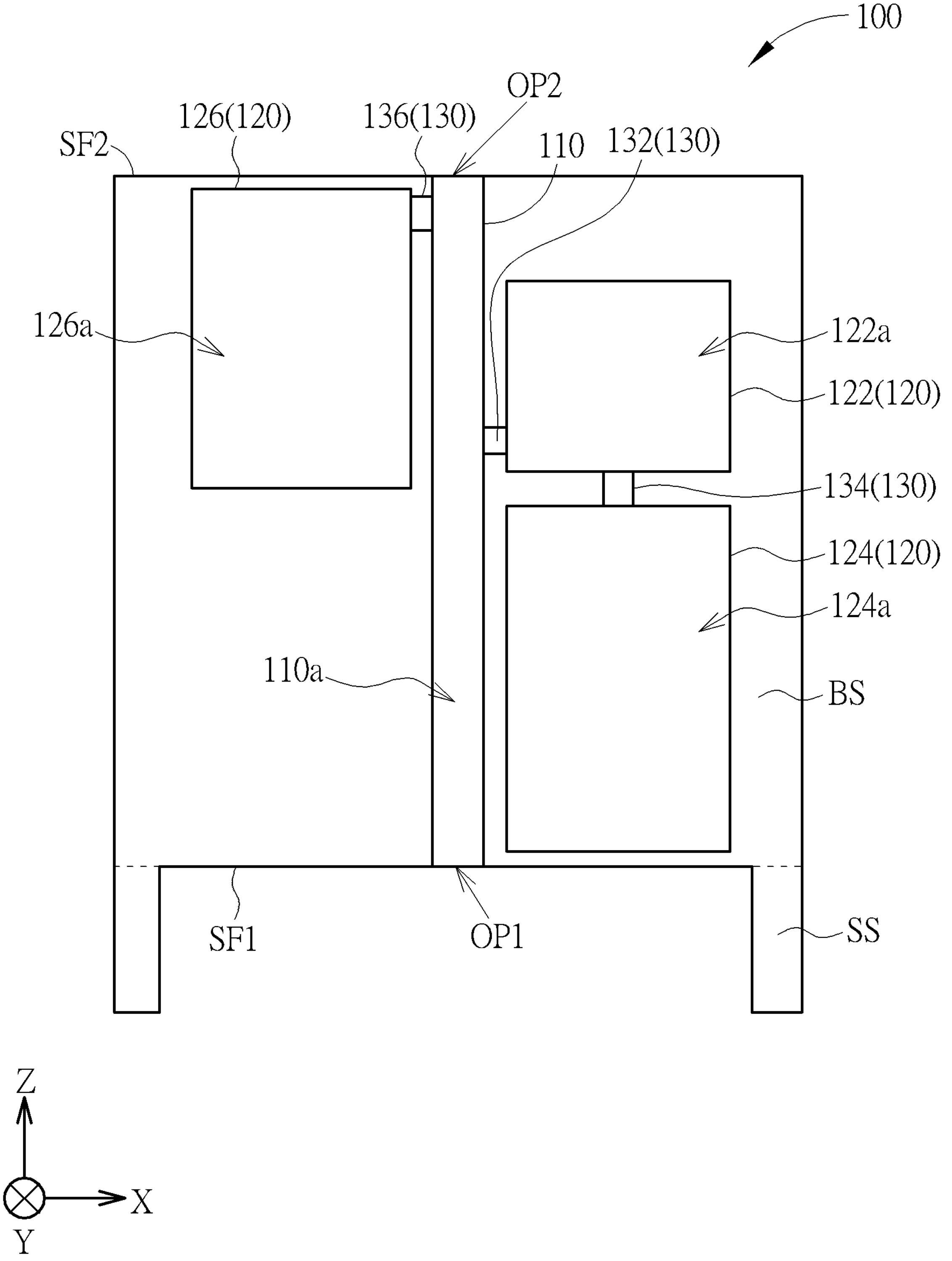
FIG. 1 is a schematic diagram of cross sectional view illustrating a covering structure according to an embodiment of the present invention.

To provide a better understanding of the present invention to those skilled in the art, preferred embodiments and typical material or range parameters for key components will be detailed in the follow description. These preferred embodiments of the present invention are illustrated in the accompanying drawings with numbered elements to elaborate on the contents and effects to be achieved. It should be noted that the drawings are simplified schematics, and the material and parameter ranges of key components are illustrative based on the present day technology, and therefore show only the components and combinations associated with the present invention, so as to provide a clearer description for the basic structure, implementing or operation method of the present invention. The components would be more complex in reality and the ranges of parameters or material used may evolve as technology progresses in the future. In addition, for ease of explanation, the components shown in the drawings may not represent their actual number, shape, and dimensions; details may be adjusted according to design requirements.

In the following description and in the claims, the terms "include", "comprise" and "have" are used in an open-ended fashion, and thus should be interpreted to mean "include, but not limited to . . . ". Thus, when the terms "include", "comprise" and/or "have" are used in the description of the present invention, the corresponding features, areas, steps, operations and/or components would be pointed to existence, but not limited to the existence of one or a plurality of the corresponding features, areas, steps, operations and/or components.

In the following description and in the claims, when a component or layer is referred to as being "connected to" another component or layer, it can be directly connected to this another component or layer, or intervening components or layers may be presented. In contrast, when a component is referred to as being "directly connected to" another component or layer, there are no intervening components or layers presented.

In the following description and in the claims, when "a A1 component is formed by/of B1", B1 exist in the formation of A1 component or B1 is used in the formation of A1 component, and the existence and use of one or a plurality of other features, areas, steps, operations and/or components are not excluded in the formation of A1 component.

In the following description and in the claims, the term "chamber" generally means an object having an empty space inside itself, and the term "cavity" means an empty space inside a chamber. That is to say, a cavity of a chamber is an empty space existing inside the chamber, and the chamber is a shell of the cavity.

In the following description and in the claims, the term "substantially" generally means a small deviation may exist or not exist. For instance, the terms "substantially parallel" and "substantially along" means that an angle between two components may be less than or equal to a certain degree threshold, e.g., 10 degrees, 5 degrees, 3 degrees or 1 degree. For instance, the term "substantially aligned" means that a deviation between two components may be less than or equal to a certain difference threshold, e.g., 2 μm or 1 μm. For instance, the term "substantially the same" means that a deviation is within, e.g., 10% of a given value or range, or mean within 5%, 3%, 2%, 1%, or 0.5% of a given value or range.

In the description and following claims, the term "horizontal direction" generally means a direction parallel to a horizontal plane, the term "horizontal plane" generally means a plane parallel to a direction X and a direction Y in the drawings (i.e., the direction X and the direction Y of the present invention may be considered as the horizontal directions), the term "vertical direction" and the term "top-view direction" generally mean a direction parallel to a direction Z and perpendicular to the horizontal direction in the drawings, and the direction X, the direction Y and the direction Z are perpendicular to each other. In the description and following claims, the term "top view" generally means a viewing result viewing along the vertical direction. In the description and following claims, the term "cross-sectional view" generally means a viewing result viewing a structure cutting along the vertical direction along the horizontal direction.

Although terms such as first, second, third, etc., may be used to describe diverse constituent elements, such constituent elements are not limited by the terms. The terms are used only to discriminate a constituent element from other constituent elements in the specification, and the terms do not relate to the sequence of the manufacture if the specification do not describe. The claims may not use the same terms, but instead may use the terms first, second, third, etc. with respect to the order in which an element is claimed. Accordingly, in the following description, a first constituent element may be a second constituent element in a claim.

It should be noted that the technical features in different embodiments described in the following can be replaced, recombined, or mixed with one another to constitute another embodiment without departing from the spirit of the present invention.

In the present invention, a covering structure configured to be disposed within a sound producing package is provided, wherein the covering structure is used to cover and protect a sound producing component in the sound producing package. In the present invention, the sound producing component is configured to perform an acoustic transformation converting signals (e.g. electric signals or signals with other suitable type) into an acoustic wave. In some embodiments, the sound producing component may be a speaker, a micro speaker or other suitable component, so as to convert the electric signals into the acoustic wave, but not limited thereto.

Figure 2:
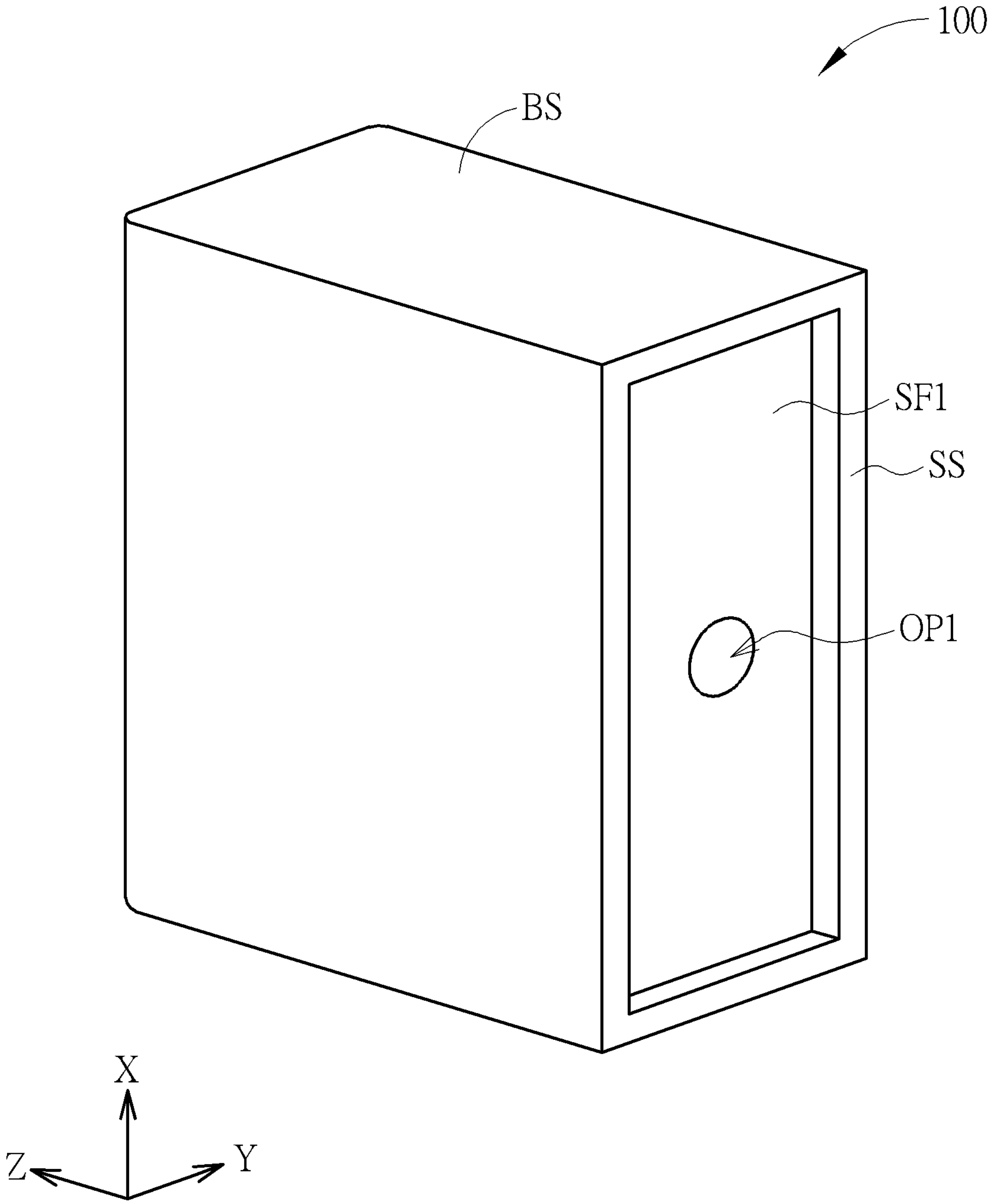
FIG. 2 and FIG. 3 are schematic diagrams of different views illustrating the covering structure shown in FIG. 1.
Figure 3:
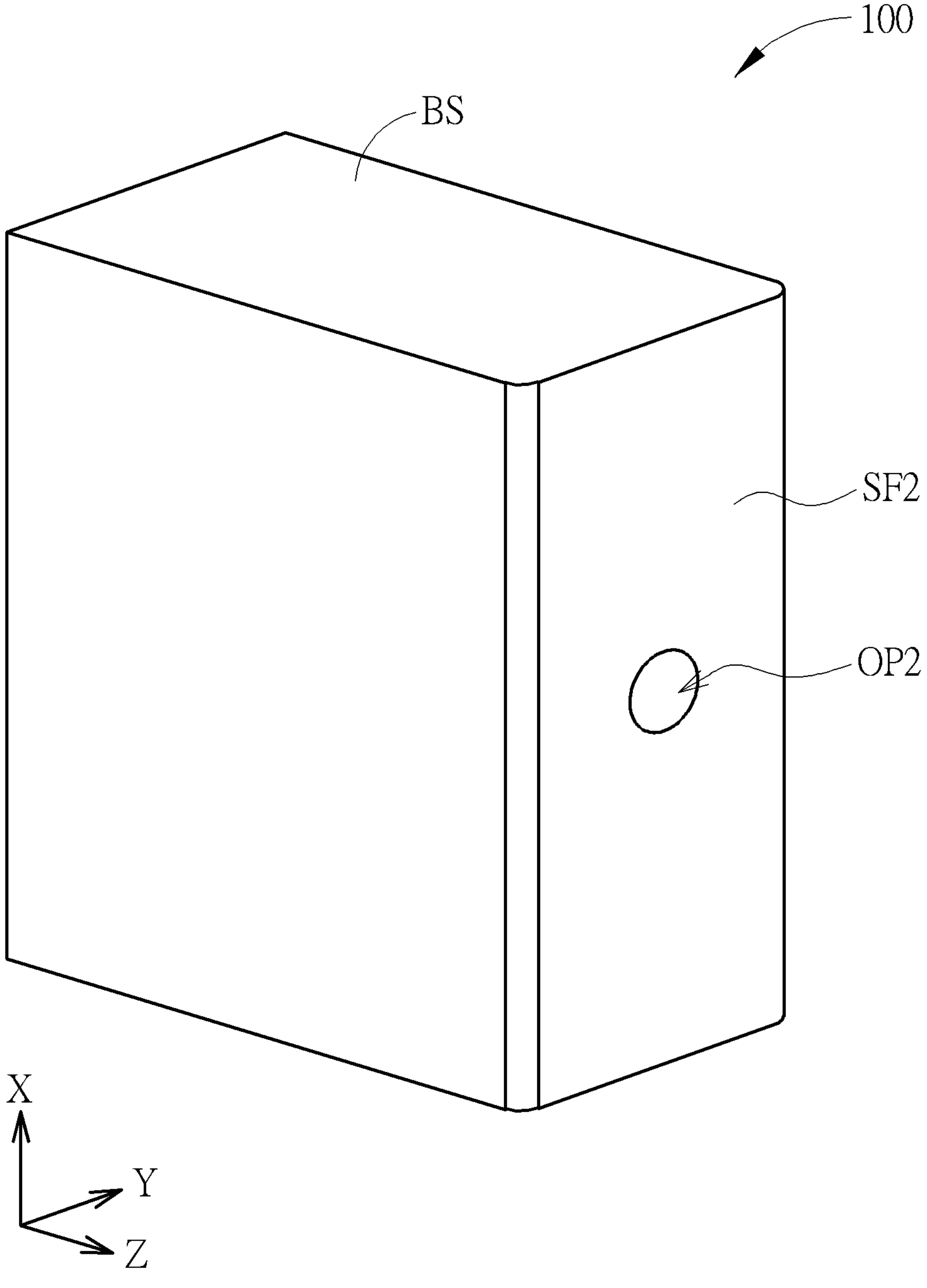

Referring to FIG. 1 to FIG. 3, FIG. 1 is a schematic diagram of cross sectional view illustrating a covering structure according to an embodiment of the present invention, and FIG. 2 and FIG. 3 are schematic diagrams of different views illustrating the covering structure shown in FIG. 1, wherein FIG. 2 and FIG. 3 show an example of an exterior of the covering structure shown in FIG. 1 in different views. As shown in FIG. 1, a covering structure 100 includes a tube structure 110 having a first sound opening OP1 and a second sound opening OP2, wherein a tube cavity 110*a* is an empty space existing inside the tube structure 110 and connected between the first sound opening OP1 and the second sound opening OP2. As shown in FIG. 1, the tube structure 110 may extend along the direction Z.

The tube structure 110 may be designed based on requirement(s), wherein the tube structure 110 may have one cross-sectional shape or a plurality of cross-sectional shapes, and the tube structure 110 may have one cross-sectional size or a plurality of cross-sectional sizes. For instance, in FIG. 1, the tube structure 110 may be a cylinder tube having one cross-sectional size, and the first sound opening OP1 and the second sound opening OP2 are circular, but not limited thereto.

As shown in FIG. 1, the covering structure 100 includes at least one chamber 120 connected to the tube structure 110, wherein the number of the chamber(s) 120 may be designed based on requirement(s). Moreover, the covering structure 100 includes at least one connecting structure 130 configured to make the cavity of the chamber 120 be connected to the tube cavity 110*a* of the tube structure 110. In the present invention, an acoustic pathway of the covering structure 100 is formed between the first sound opening OP1 and the second sound opening OP2, such that the tube structure 110, the chamber(s) 120 and the connecting structure(s) 130 would influence an acoustic wave passing through the acoustic pathway, wherein the first sound opening OP1 is a sound inlet of the covering structure 100, and the second sound opening OP2 is a sound outlet of the covering structure 100. In the present invention, the influence of the tube structure 110, the chamber(s) 120 and the connecting structure(s) 130 on the acoustic wave may be controlled by adjusting sizes, numbers and positions of the tube structure 110, the chamber(s) 120 and the connecting structure(s) 130, so as to make the acoustic wave passing through the covering structure 100 meet the requirement(s).

In FIG. 1, the covering structure 100 includes a first chamber 122, wherein a first cavity 122*a* exists inside the first chamber 122 and is connected to the tube cavity 110*a* of the tube structure 110. In FIG. 1, the covering structure 100 includes a first connecting structure 132 connected between the tube structure 110 and the first chamber 122, such that the first cavity 122*a* of the first chamber 122 is connected to the tube cavity 110*a* of the tube structure 110 through a first air channel inside the first connecting structure 132. In FIG. 1, the first connecting structure 132 is between the first sound opening OP1 and the second sound opening OP2.

Optionally, the covering structure 100 may include a second chamber 124, wherein a second cavity 124*a* may exist inside the second chamber 124 and be connected to the first cavity 122*a* of the first chamber 122. In FIG. 1, the covering structure 100 may include a second connecting structure 134 connected between the first chamber 122 and the second chamber 124, such that the second cavity 124*a* of the second chamber 124 may be connected to the first cavity 122*a* of the first chamber 122 through a second air channel inside the second connecting structure 134 (i.e., the second cavity 124*a* of the second chamber 124 may be connected to the tube cavity 110*a* of the tube structure 110 through the second air channel, the first cavity 122*a* and the first air channel). In FIG. 1, the second connecting structure 134 may be between the first sound opening OP1 and the second sound opening OP2 also.

Optionally, the covering structure 100 may include a third chamber 126, wherein a third cavity 126*a* may exist inside the third chamber 126 and be connected to the tube cavity 110*a* of the tube structure 110. In FIG. 1, the covering structure 100 may include a third connecting structure 136 connected between the tube structure 110 and the third chamber 126, such that the third cavity 126*a* of the third chamber 126 may be connected to the tube cavity 110*a* of the tube structure 110 through a third air channel inside the third connecting structure 136. In FIG. 1, the third connecting structure 136 may be between the first sound opening OP1 and the second sound opening OP2 also.

FIG. 1 shows an example of the covering structure 100, and the sizes and the positions of the tube structure 110, the chambers 120 and the connecting structures 130 are not restricted by FIG. 1. For example (as shown in FIG. 1), the tube structure 110 may be between the first chamber 122 and the third chamber 126, and the tube structure 110 may be between the second chamber 124 and the third chamber 126, but not limited thereto. For example (as shown in FIG. 1), the first chamber 122 may be between the second chamber 124 and the second sound opening OP2, but not limited thereto. For example (as shown in FIG. 1), in the direction Z, a distance between the third chamber 126 and the second sound opening OP2 may be less than a distance between the first chamber 122 and the second sound opening OP2, but not limited thereto.

For example (as shown in FIG. 1), the first connecting structure 132 may be between the first sound opening OP1 and the third connecting structure 136, and the third connecting structure 136 may be between the first connecting structure 132 and the second sound opening OP2, but not limited thereto. For example (as shown in FIG. 1), the first connecting structure 132 may be connected to the first chamber 122 at a position of the first chamber 122 closer to the first sound opening OP1, but not limited thereto. For example (as shown in FIG. 1), the second connecting structure 134 may be connected to a center position of the second chamber 124 and a center position of the first chamber 122, but not limited thereto. For example (as shown in FIG. 1), the third connecting structure 136 may be connected to the third chamber 126 at a position of the third chamber 126 closer to the second sound opening OP2, but not limited thereto.

The shape of the chamber 120 and the shape of the connecting structure 130 may be designed based on requirement(s). For example (as shown in FIG. 1), all of the first chamber 122, the second chamber 124 and the third chamber 126 may be quadrilateral prisms, but not limited thereto. For example (as shown in FIG. 1), all of the first connecting structure 132, the second connecting structure 134 and the third connecting structure 136 may be circular tubes, but not limited thereto.

The size of the chamber 120 and the size of the connecting structure 130 may be designed based on requirement(s). For example (as shown in FIG. 1), the size of the first chamber 122 may be smaller than the size of the third chamber 126, and the size of the third chamber 126 may be smaller than the second chamber 124, but not limited thereto.

For example (as shown in FIG. 1), a diameter and a length of the tube structure 110 may be 0.7 mm and 10 mm respectively, but not limited thereto. For example (as shown in FIG. 1), three dimensions of the first chamber 122 may be 3.4 mm, 2.59 mm and 4 mm respectively, three dimensions of the second chamber 124 may be 3.4 mm, 5.18 mm and 4 mm respectively, and three dimensions of the third chamber 126 may be 3.4 mm, 4.44 mm and 4 mm respectively, but not limited thereto. For example (as shown in FIG. 1), a diameter and a length of the first connecting structure 132 may be 0.432 mm and 0.584 mm respectively, a diameter and a length of the second connecting structure 134 may be 0.54 mm and 0.6 mm respectively, and a diameter and a length of the third connecting structure 136 may be 0.54 mm and 0.287 mm respectively, but not limited thereto.

Note that the present invention is not limited by the above values related to the sizes of the tube structure 110, the chambers 120 and the connecting structures 130. For instance, if at least one of the positions of the tube structure 110, the chambers 120 and the connecting structures 130 is adjusted, at least one the sizes of the tube structure 110, the chambers 120 and the connecting structures 130 would be correspondingly adjusted, so as to maintain the effect of the covering structure 100.

The covering structure 100 with the aforementioned design may be achieved in any suitable way. In some embodiments, as shown in FIG. 1 and FIG. 3, the covering structure 100 may further include a blocky structure BS, wherein the tube structure 110, the chambers 120 and the connecting structures 130 may belong to the blocky structure BS, and the tube structure 110 may pass through the blocky structure BS. Namely, the tube structure 110 and the chambers 120 are inner sidewalls in the blocky structure BS to surround their cavities respectively, and the connecting structures 130 are inner sidewalls in the blocky structure BS to surround their air channels.

In FIG. 1 to FIG. 3, the blocky structure BS may include a first surface SF1 and a second surface SF2 opposite to the first surface SF1 in the direction Z, the first sound opening OP1 may belong to the first surface SF1 of the blocky structure BS, and the second sound opening OP2 may belong to the second surface SF2 of the blocky structure BS.

In addition, as shown in FIG. 1 and FIG. 2, the covering structure 100 may further include a supporting structure SS connected to the blocky structure BS, wherein the supporting structure SS protrudes outwards from the first surface SF1 and surrounds the first sound opening OP1. For example (as shown in FIG. 2), the supporting structure SS and the blocky structure BS may form a one-piece structure (i.e., the supporting structure SS and the blocky structure BS may be integrated and included in one structure), but not limited thereto. When the covering structure 100 is used in a sound producing package and covers a sound producing component of the sound producing package, the supporting structure SS may be configured to generate a space where the sound producing component is disposed.

Figure 4:
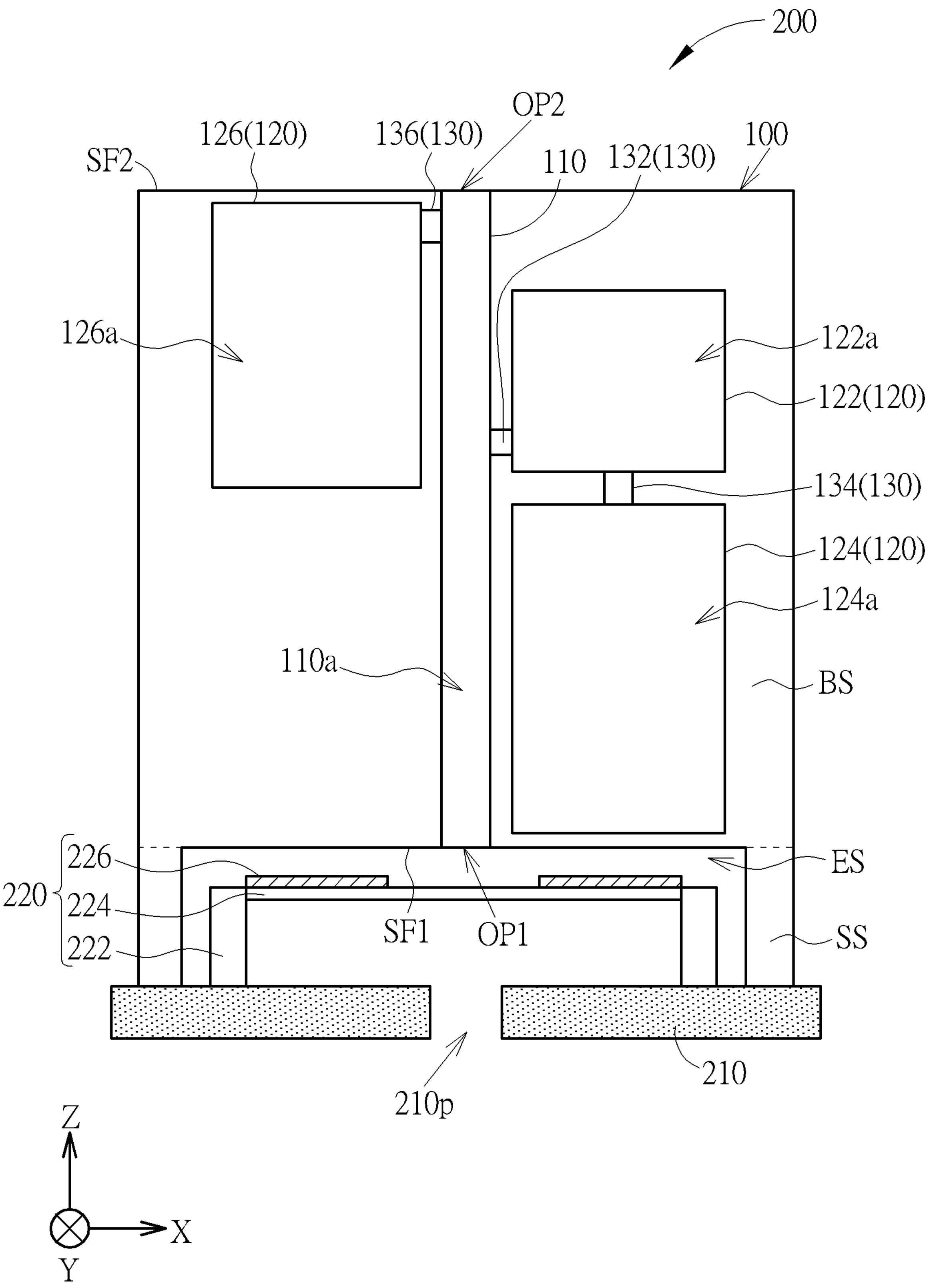
FIG. 4 is a schematic diagram of cross sectional view illustrating a sound producing package according to an embodiment of the present invention.

Referring to FIG. 4, FIG. 4 is a schematic diagram of cross sectional view illustrating a sound producing package according to an embodiment of the present invention. As shown in FIG. 4, a sound producing package 200 includes a substrate 210, a sound producing component 220 and the aforementioned covering structure 100, wherein the sound producing component 220 is disposed on the substrate 210 and configured to produce an acoustic wave, and the covering structure 100 is disposed on the substrate 210 and the sound producing component 220 to cover the sound producing component 220.

The substrate 210 may be designed based on requirement(s). The substrate 210 may be hard or flexible, wherein the substrate 210 may include silicon, germanium, glass, plastic, quartz, sapphire, metal, polymer (e.g., polyimide (PI), polyethylene terephthalate (PET)), any other suitable material or a combination thereof. As an example, the substrate 210 may be a circuit board including a laminate (e.g., copper clad laminate, CCL), a land grid array (LGA) board or any other suitable board containing conductive material, but not limited thereto. In FIG. 4, a normal direction of the substrate 210 may be parallel to the direction Z. In FIG. 4, the substrate 210 may include a bottom opening 210*p*.

The sound producing component 220 and the covering structure 100 may be disposed on the substrate 210 by any suitable method and any suitable adhesive material (e.g., a conductive adhesive material or an insulating adhesive material). For example, the sound producing component 220 may be disposed on the substrate 210 by a conductive adhesive material (e.g., solder), such that the sound producing component 220 may be electrically connected to a conductive component belonging to the substrate 210. For example, the supporting structure SS of the covering structure 100 may be connected to the substrate 210 through the adhesive material, such that a space ES may be formed between the substrate 210 and the covering structure 100, and the sound producing component 220 may be disposed in this space ES and surrounded by the supporting structure SS.

In FIG. 4, since the first sound opening OP1 (i.e., the sound inlet) of the covering structure 100 faces to the sound producing component 220, the acoustic wave generated by the sound producing component 220 would propagate through the acoustic pathway of the covering structure 100.

As shown in FIG. 4, the sound producing component 220 includes an anchor structure 222, a membrane 224 anchored by the anchor structure 222 and an actuator 226 configured to actuate the membrane 224 to produce the acoustic wave. In some embodiments, the anchor structure 222 may be disposed outside the membrane 224, and the actuator 226 may be disposed on the membrane 224.

The membrane 224 and the anchor structure 222 may include any suitable material(s). In some embodiments, the membrane 224 and the anchor structure 222 may individually include silicon (e.g., single crystalline silicon or polycrystalline silicon), silicon compound (e.g., silicon carbide, silicon oxide), germanium, germanium compound, gallium, gallium compound (e.g., gallium nitride or gallium arsenide), stainless steel or a combination thereof, but not limited thereto. In some embodiments, the membrane 224 and the anchor structure 222 may have the same material.

In the operation of the sound producing component 220, the membrane 224 may be actuated to have a movement, and the anchor structure 222 may be immobilized. Namely, the anchor structure 222 may be a fixed end (or fixed edge) respecting the membrane 224 during the operation of the sound producing component 220. For example, the membrane 224 may be actuated to move upwards and downwards, wherein the terms "move upwards" and "move downwards" represent that the membrane 224 moves substantially along the normal direction of the substrate 210 (e.g., in FIG. 4, the membrane 224 moves substantially along the direction Z).

The membrane 224 may be designed based on requirement(s). For example, the membrane 224 may include a plurality of sub-parts and at least one slit, wherein the sub-parts may be divided by the slit, but not limited thereto. Note that the slit has a sufficiently small width to be a narrow slit.

The actuator 226 has a monotonic electromechanical converting function with respect to the movement of the membrane 224. In some embodiments, the actuator 226 may include a piezoelectric actuator, an electrostatic actuator, a nanoscopic-electrostatic-drive (NED) actuator, an electromagnetic actuator or any other suitable actuator. For example, in an embodiment, the actuator 226 may include a piezoelectric actuator, the piezoelectric actuator may contain such as two electrodes and a piezoelectric material layer (e.g., lead zirconate titanate, PZT) disposed between the electrodes, wherein the piezoelectric material layer may actuate the membrane 224 based on driving signals (e.g., driving voltages and/or driving voltage difference between two electrodes) received by the electrodes, but not limited thereto. For example, in another embodiment, the actuator 226 may include an electromagnetic actuator (such as a planar coil), wherein the electromagnetic actuator may actuate the membrane 224 based on a received driving signals (e.g., driving current) and a magnetic field (i.e. the membrane 224 may be actuated by the electromagnetic force), but not limited thereto. For example, in still another embodiment, the actuator 226 may include an electrostatic actuator (such as conducting plate) or a NED actuator, wherein the electrostatic actuator or the NED actuator may actuate the membrane 224 based on a received driving signals (e.g., driving voltage) and an electrostatic field (i.e. the membrane 224 may be actuated by the electrostatic force), but not limited thereto.

In some embodiments, the sound producing component 220 may be a micro electro mechanical system (MEMS) speaker, such that the sound producing component 220 may have a small size and be formed by at least one semiconductor process, but not limited thereto.

A first resonant frequency of the sound producing component 220 is a smallest resonant frequency of the sound producing component 220. In some embodiments, the first resonant frequency of the sound producing component 220 may be high. For example, the first resonant frequency of the sound producing component 220 may be greater than or equal to 10 kHz (e.g., the first resonant frequency may range from 10 kHz to 20 kHz), but not limited thereto.

In the present invention, the covering structure 100 is disposed on the sound producing component 220 and provides the acoustic pathway, so as to influence the acoustic wave passing through the acoustic pathway. In the present invention, the covering structure 100 causes different/several transmission losses on the acoustic waves with different frequencies (the covering structure 100 influences the frequency response of the sound producing package 200), thereby adjusting the sound pressure level (SPL) of the acoustic waves with different frequencies. Through the appropriate design of the covering structure 100, the acoustic wave would meet the requirement(s) of a sound producing device where the sound producing package 200 is disposed.

In some embodiments, the sound producing package 200 may be configured to be used in a hearing aid (i.e., the sound producing device where the sound producing package 200 is disposed may be a hearing aid), such that the acoustic wave should meet the requirement(s) of the hearing aid. For example, American National Standards Institute (ANSI) specifies a standard of ANSI S3.22 related to the hearing aid, and the frequency response of the sound producing package 200 meets a standard of ANSI S3.22, such that the acoustic wave meets the requirement(s) of the hearing aid.

Figure 5:
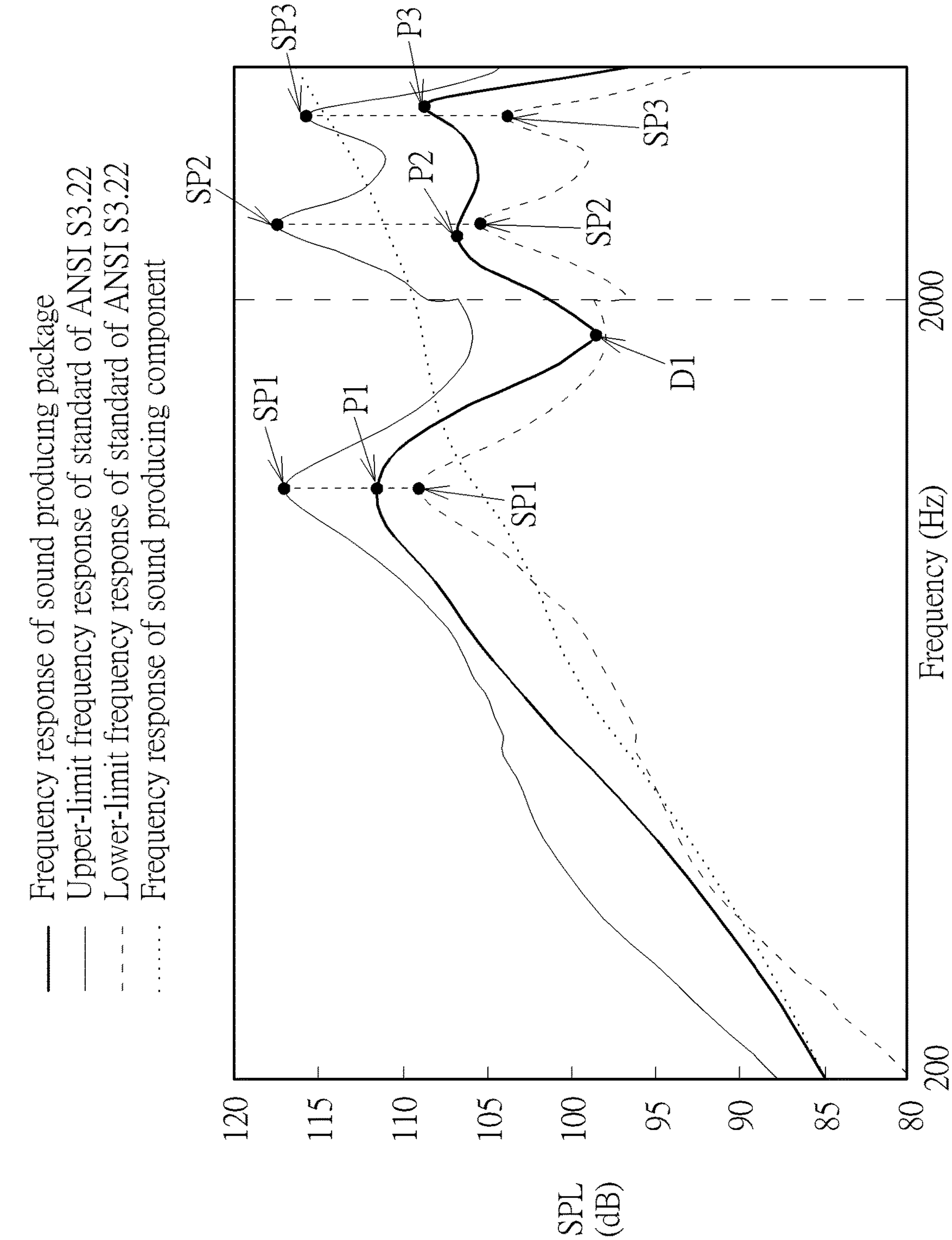
FIG. 5 is a schematic diagram illustrating frequency responses of the sound producing component and the sound producing package shown in FIG. 4, an upper-limit frequency response specified by a standard of ANSI S3.22 and a lower-limit frequency response specified by a standard of ANSI S3.22.
Figure 6:
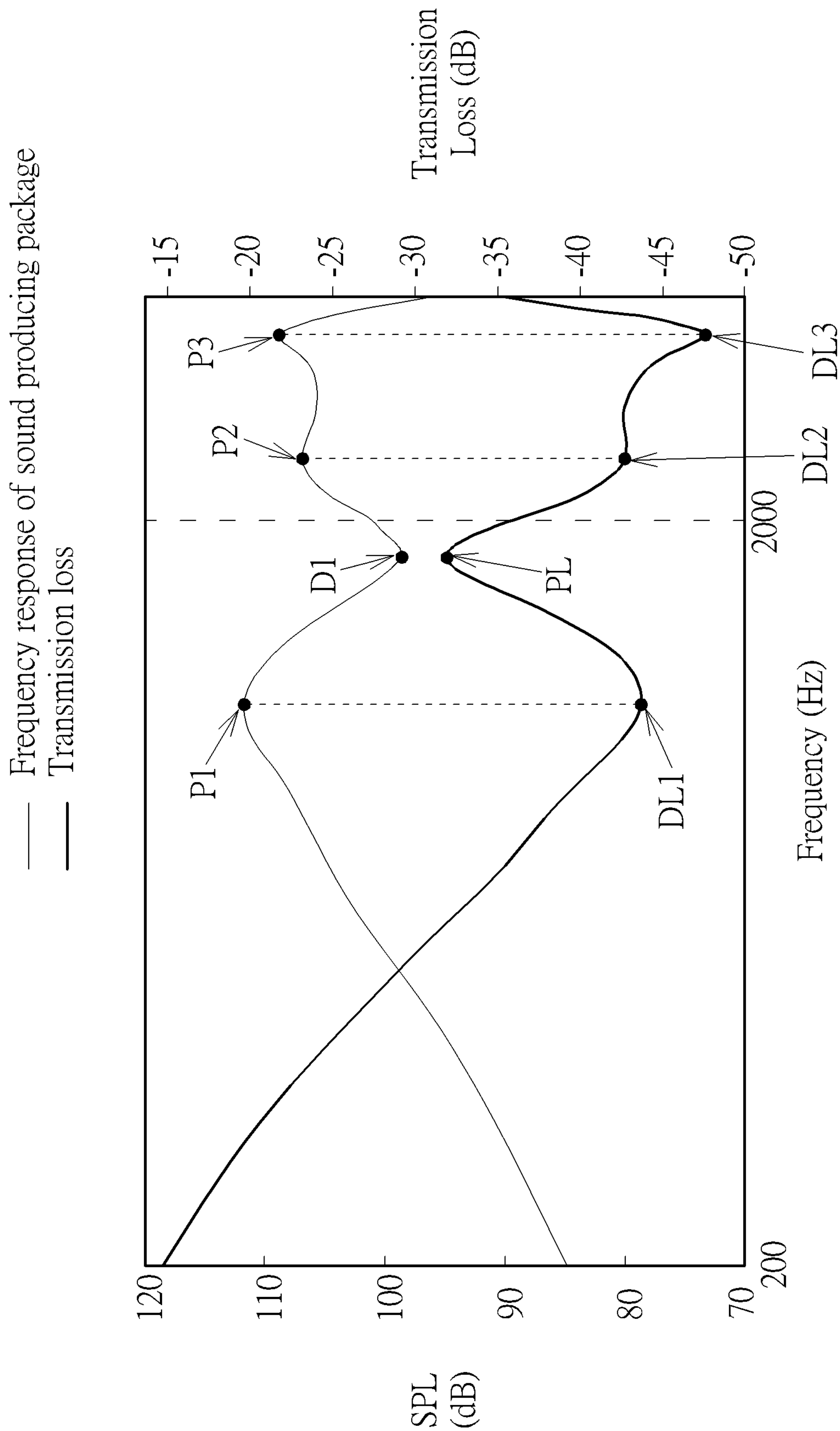
FIG. 6 is a schematic diagram illustrating a frequency response of the sound producing package shown in FIG. 4 and a transmission loss caused by the covering structure shown in FIG. 4.

Further referring to FIG. 5 and FIG. 6, FIG. 5 is a schematic diagram illustrating frequency responses of the sound producing component and the sound producing package shown in FIG. 4, an upper-limit frequency response specified by a standard of ANSI S3.22 and a lower-limit frequency response specified by a standard of ANSI S3.22, and FIG. 6 is a schematic diagram illustrating a frequency response of the sound producing package shown in FIG. 4 and a transmission loss caused by the covering structure shown in FIG. 4.

As shown in the frequency response plot of FIG. 5, the first resonant frequency of the sound producing component 220 is greater than 10 kHz. Furthermore, in the standard of ANSI S3.22, three specified peaks exist in a frequency range from 200 Hz to 4000 Hz, wherein a frequency of a first specified peak SP1 is 1150 Hz, a frequency of a second specified peak SP2 is 2480 Hz, and a frequency of a third specified peak SP3 is 3420 Hz. Furthermore, in the standard of ANSI S3.22, a SPL difference between the upper-limit frequency response and the lower-limit frequency response is 8 dB in a frequency range from 200 Hz to 2000 Hz, and a SPL difference between the upper-limit frequency response and the lower-limit frequency response is 12 dB in a frequency range from 2000 Hz to 4000 Hz.

As shown in FIG. 4 and FIG. 5, due to the design of the covering structure 100, in a frequency range from 200 Hz to 4000 Hz, a frequency response of the sound producing package 200 may be situated between the upper-limit frequency response and the lower-limit frequency response specified by the standard of ANSI S3.22, such that the acoustic wave of the sound producing package 200 meets the requirement(s) of the hearing aid after the acoustic wave passes through the acoustic pathway of the covering structure 100, given the sound producing component 220 is utilized.

In the present invention, as shown in FIG. 6, the covering structure 100 makes the frequency response of the sound producing package 200 be situated between the upper-limit frequency response and the lower-limit frequency response specified by the standard of ANSI S3.22 in a frequency range from 200 Hz to 4000 Hz through causing the different transmission losses on the acoustic waves with different frequencies, wherein the transmission loss caused by the covering structure 100 is related to the design of the tube structure 110, the chamber(s) 120 and the connecting structure(s) 130. Note that the transmission loss be calculated by a formula:

$$TL = 10\log\frac{W_i}{W_t},$$

wherein TL is the transmission loss, the unit of TL is dB, $W_i$ is the power of the acoustic wave before the acoustic wave passes through the covering structure 100, and $W_t$ is the power of the acoustic wave after the acoustic wave passes through the covering structure 100. Note that, in FIG. 6, the transmission losses in a frequency range from 200 Hz to 4000 Hz are negative. In the present invention, the transmission loss is increased as the absolute value of the transmission loss is enhanced (i.e., the value of the transmission loss is more negative).

According to the upper-limit frequency response and the lower-limit frequency response specified by the standard of ANSI S3.22, the sound producing component 220 having the high first resonant frequency (e.g., the first resonant frequency of the sound producing component 220 is greater than or equal to 10 kHz) is not beneficial to meeting the standard of ANSI S3.22. In the present invention, the tube structure 110 of the covering structure 100 is configured to suppress and/or degrade the SPL of the acoustic wave with a frequency higher than a specific frequency (e.g., 2000 Hz). Namely, because of the existence of the tube structure 110 of the covering structure 100, the effect caused by the high first resonant frequency of the sound producing component 220 on the acoustic wave may be suppressed and/or degraded after the acoustic wave passing through the tube structure 110 of the covering structure 100, so as to make the frequency response of the sound producing package 200 close to the standard of ANSI S3.22. For instance, the tube structure 110 of the covering structure 100 may suppress and/or degrade the SPL of the acoustic wave with a frequency ranging from 2000 Hz to 10000 Hz, but not limited thereto.

In addition, the suppressing (and/or degrading) effect caused by the tube structure 110 is increased as a ratio of an area of the first sound opening OP1 to an area of the membrane 224 of the sound producing component 220 is decreased. For example, the ratio of the area of the first sound opening OP1 to the area of the membrane 224 of the sound producing component 220 may be less than or equal to 0.2, so as to enhance the suppressing (and/or degrading) effect caused by the tube structure 110, but not limited thereto. Furthermore, in some embodiments (as shown in FIG. 4), the area of the membrane 224 of the sound producing component 220 may be similar to an area of the first surface SF1 of the covering structure 100, such that the ratio of the area of the first sound opening OP1 to the area of the membrane 224 may be similar to a ratio of the area of the first sound opening OP1 to the area of the first surface SF1. For example, the ratio of the area of the first sound opening OP1 to the area of the first surface SF1 of the covering structure 100 may be less than or equal to 0.2, but not limited thereto.

On the other hand, as shown in FIG. 5, the covering structure 100 may make the frequency response of the sound producing package 200 have three peaks (i.e., a first peak P1, a second peak P2 and a third peak P3) in a frequency range from 200 Hz to 4000 Hz, wherein the first peak P1, the second peak P2 and the third peak P3 may be respectively corresponding to the first specified peak SP1, the second specified peak SP2 and the third specified peak SP3 specified by the standard of ANSI S3.22. In some embodiments, a first frequency of the first peak P1 may range from 1050 Hz to 1250 Hz, a second frequency of the second peak P2 may range from 2230 Hz to 2630 Hz or range from 2280 Hz to 2680 Hz, and a third frequency of the third peak P3 may range from 3300 Hz to 3700 Hz or range from 3220 Hz to 3620 Hz. For example, in FIG. 5, the first frequency may be 1150 Hz, the second frequency may be 2430 Hz, and the third frequency may be 3500 Hz, but not limited thereto.

As shown in FIG. 5 and FIG. 6, the first peak P1, the second peak P2 and the third peak P3 of the frequency response of the sound producing package 200 are generated by increasing the transmission loss, wherein the first peak P1, the second peak P2 and the third peak P3 of the frequency response of the sound producing package 200 are respectively corresponding to a first transmission-losing dip DL1, a second transmission-losing dip DL2 and a third transmission-losing dip DL3 in the plot of the transmission loss. For instance, the first transmission-losing dip DL1 corresponding to the first peak P1 of the frequency response of the sound producing package 200 may be mainly created by the tube structure 110, the first chamber 122 and the second chamber 124 (i.e., the first peak P1 may be mainly caused by the tube structure 110, the first chamber 122 and the second chamber 124), the second transmission-losing dip DL2 corresponding to the second peak P2 of the frequency response of the sound producing package 200 may be mainly created by the first chamber 122 and the second chamber 124 (i.e., the second peak P2 may be mainly caused by the first chamber 122 and the second chamber 124), and the third transmission-losing dip DL3 corresponding to the third peak P3 of the frequency response of the sound producing package 200 may be mainly created by the third chamber 126 (i.e., the third peak P3 may be mainly caused by the third chamber 126), but not limited thereto.

For example, in FIG. 6, the first transmission-losing dip DL1 and the first peak P1 may have the same frequency, the second transmission-losing dip DL2 and the second peak P2 may have the same frequency, and the third transmission-losing dip DL3 and the third peak P3 may have the same frequency, but not limited thereto.

Furthermore, as shown in FIG. 5 and FIG. 6, the plot of the transmission loss may optionally have a transmission-losing peak PL corresponding to a dip D1 of the frequency response of the sound producing package 200, so as to make the frequency response of the sound producing package 200 more compliant with the standard of ANSI S3.22. As shown in FIG. 6, the transmission-losing peak PL may be between the first transmission-losing dip DL1 and the second transmission-losing dip DL2. For example, the frequency of the transmission-losing peak PL may be 1850 Hz, and the transmission-losing peak PL may be mainly created by the second chamber 124, but not limited thereto. For example, the transmission-losing peak PL and the dip D1 may have the same frequency, but not limited thereto.

For example, as shown in FIG. 6, a maximum transmission loss caused by the covering structure 100 to the acoustic wave passing through the acoustic pathway may occur in a frequency range from 2000 Hz to 4000 Hz, but not limited thereto. For example, the maximum transmission loss may occur at the third transmission-losing dip DL3, but not limited thereto.

According to the above, the effect caused by the tube structure 110, the chamber(s) 120 and the connecting structure(s) 130 on the acoustic wave may be similar to an acoustic band-pass filter.

Moreover, the sound producing package 200 has an operating frequency range suitable for the hearing aid and/or the standard of ANSI S3.22, and the operating frequency range may be calculated by the following calculating method. In this calculating method, a high frequency average (HFA) is calculated by averaging SPL values at 1000 Hz, 1600 Hz and 2500 Hz in the frequency response of the sound producing package 200, and an upper bound and a lower bound of the operating frequency range have SPL values equal to a value of HFA minus 20 dB, so as to obtain the operating frequency range of the sound producing package 200. For example, in the frequency response of the sound producing package 200 shown in FIG. 5, the upper bound and the lower bound of the operating frequency range of the sound producing package 200 may be 4250 Hz and 200 Hz respectively, and therefore, the operating frequency range of the sound producing package 200 may cover a frequency range from 200 Hz to 4000 Hz, so as to make the sound producing package 200 suitable for the hearing aid and meet the standard of ANSI S3.22.

Accordingly, because of the design of the covering structure 100, some sound producing components 220 which do not meet the standard of the hearing aid could be used in the hearing aid.

The present invention further provides a manufacturing method of the sound producing package 200 shown in FIG. 4. In the manufacturing method, the sound producing component 220 is formed and disposed on the substrate 210. For example, the sound producing component 220 may be formed by at least one semiconductor process. Then, the covering structure 100 is formed to cover the sound producing component 220, such that the sound producing package 200 is formed.

In summary, the covering structure of the present invention could influence the acoustic wave passing through the acoustic pathway of the covering structure, so as to make the acoustic wave meet the requirement(s) of the sound producing device.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A covering structure, disposed within a sound producing package, the covering structure comprising:

a tube structure having a first sound opening and a second sound opening, wherein a tube cavity connected between the first sound opening and the second sound opening exists inside the tube structure;

a first chamber, wherein a first cavity exists inside the first chamber and is connected to the tube cavity of the tube structure;

a first connecting structure connected between the tube structure and the first chamber, wherein the first connecting structure is between the first sound opening and the second sound opening, and the first cavity of the first chamber is connected to the tube cavity of the tube structure through the first connecting structure;

a second chamber, wherein a second cavity exists inside the second chamber and is connected to the first cavity of the first chamber; and a second connecting structure connected between the first chamber and the second chamber, wherein the second cavity of the second chamber is connected to the first cavity of the first chamber through the second connecting structure;

wherein an acoustic pathway of the covering structure is formed between the first sound opening and the second sound opening.

2. The covering structure of claim 1, further comprising:

a third chamber, wherein a third cavity exists inside the third chamber and is connected to the tube cavity of the tube structure; and a third connecting structure connected between the tube structure and the third chamber, wherein the third connecting structure is between the first sound opening and the second sound opening, and the third cavity of the third chamber is connected to the tube cavity of the tube structure through the third connecting structure.

3. The covering structure of claim 1, further comprising a blocky structure, wherein the tube structure and the first chamber belong to the blocky structure, and the tube structure passes through the blocky structure.

4. The covering structure of claim 3, wherein the first sound opening belongs to a first surface of the blocky structure, and a ratio of an area of the first sound opening to an area of the first surface is less than or equal to 0.2.

5. The covering structure of claim 1, wherein the covering structure is configured to cover a sound producing component of the sound producing package to make a frequency response of the sound producing package have three peaks in a frequency range from 200 Hz to 4000 Hz.

6. The covering structure of claim 1, wherein a maximum transmission loss caused by the covering structure to an acoustic wave passing through the acoustic pathway occurs in a frequency range from 2000 Hz to 4000 Hz.

7. The covering structure of claim 1, further comprising a supporting structure surrounding the first sound opening.

8. A sound producing package, comprising:

a sound producing component configured to produce an acoustic wave; and a covering structure covering the sound producing component, the covering structure comprising:

a tube structure having a first sound opening and a second sound opening, wherein a tube cavity connected between the first sound opening and the second sound opening exists inside the tube structure;

a first chamber, wherein a first cavity exists inside the first chamber and is connected to the tube cavity of the tube structure;

a first connecting structure connected between the tube structure and the first chamber, wherein the first connecting structure is between the first sound opening and the second sound opening, and the first cavity of the first chamber is connected to the tube cavity of the tube structure through the first connecting structure;

a second chamber, wherein a second cavity exists inside the second chamber and is connected to the first cavity of the first chamber; and a second connecting structure connected between the first chamber and the second chamber, wherein the second cavity of the second chamber is connected to the first cavity of the first chamber through the second connecting structure;

wherein an acoustic pathway of the covering structure is formed between the first sound opening and the second sound opening, and the acoustic wave propagates through the acoustic pathway.

9. The sound producing package of claim 8, wherein the covering structure further comprises:

a third chamber, wherein a third cavity exists inside the third chamber and is connected to the tube cavity of the tube structure; and a third connecting structure connected between the tube structure and the third chamber, wherein the third connecting structure is between the first sound opening and the second sound opening, and the third cavity of the third chamber is connected to the tube cavity of the tube structure through the third connecting structure.

10. The sound producing package of claim 8, wherein a frequency response of the sound producing package has a first peak, and a first frequency of the first peak ranges from 1050 Hz to 1250 Hz.

11. The sound producing package of claim 8, wherein a frequency response of the sound producing package has a second peak, and a second frequency of the second peak ranges from 2230 Hz to 2630 Hz.

12. The sound producing package of claim 8, wherein a frequency response of the sound producing package has a third peak, and a third frequency of the third peak ranges from 3300 Hz to 3700 Hz.

13. The sound producing package of claim 8, wherein a first resonant frequency of the sound producing component is greater than or equal to 10 KHz.

14. The sound producing package of claim 8, wherein the sound producing component comprises a membrane and an actuator configured to actuate the membrane to produce the acoustic wave.

15. The sound producing package of claim 8, wherein the sound producing component is a micro electro mechanical system (MEMS) speaker.

16. The sound producing package of claim 8, wherein a frequency response of the sound producing package meets a standard of ANSI S3.22.

17. The sound producing package of claim 8, wherein the sound producing package is configured to be used in a hearing aid.

18. A manufacturing method of a sound producing package, comprising:

forming a sound producing component, wherein the sound producing component is configured to produce an acoustic wave; and forming a covering structure to cover the sound producing component, wherein the covering structure comprises:

a tube structure having a first sound opening and a second sound opening, wherein a tube cavity connected between the first sound opening and the second sound opening exists inside the tube structure;

a first chamber, wherein a first cavity exists inside the first chamber and is connected to the tube cavity of the tube structure;

a first connecting structure connected between the tube structure and the first chamber, wherein the first connecting structure is between the first sound opening and the second sound opening, and the first cavity of the first chamber is connected to the tube cavity of the tube structure through the first connecting structure;

a second chamber, wherein a second cavity exists inside the second chamber and is connected to the first cavity of the first chamber; and a second connecting structure connected between the first chamber and the second chamber, wherein the second cavity of the second chamber is connected to the first cavity of the first chamber through the second connecting structure;

wherein an acoustic pathway of the covering structure is formed between the first sound opening and the second sound opening, and the acoustic wave propagates through the acoustic pathway.

19. A covering structure, disposed within a sound producing package, the covering structure comprising:

a tube structure having a first sound opening and a second sound opening, wherein a tube cavity connected between the first sound opening and the second sound opening exists inside the tube structure;

a first chamber, wherein a first cavity exists inside the first chamber and is connected to the tube cavity of the tube structure; and a first connecting structure connected between the tube structure and the first chamber, wherein the first connecting structure is between the first sound opening and the second sound opening, and the first cavity of the first chamber is connected to the tube cavity of the tube structure through the first connecting structure;

wherein an acoustic pathway of the covering structure is formed between the first sound opening and the second sound opening;

wherein the covering structure is configured to cover a sound producing component of the sound producing package to make a frequency response of the sound producing package have three peaks in a frequency range from 200 Hz to 4000 Hz.

20. A covering structure, disposed within a sound producing package, the covering structure comprising:

a tube structure having a first sound opening and a second sound opening, wherein a tube cavity connected between the first sound opening and the second sound opening exists inside the tube structure;

a first chamber, wherein a first cavity exists inside the first chamber and is connected to the tube cavity of the tube structure; and a first connecting structure connected between the tube structure and the first chamber, wherein the first connecting structure is between the first sound opening and the second sound opening, and the first cavity of the first chamber is connected to the tube cavity of the tube structure through the first connecting structure;

wherein an acoustic pathway of the covering structure is formed between the first sound opening and the second sound opening;

wherein a maximum transmission loss caused by the covering structure to an acoustic wave passing through the acoustic pathway occurs in a frequency range from 2000 Hz to 4000 Hz, and a frequency at which the maximum transmission loss occurs is corresponding to a frequency of a peak of a frequency response of the sound producing package.

* * * * *